United States Patent
Yokoyama et al.

(10) Patent No.: US 8,116,891 B2
(45) Date of Patent: Feb. 14, 2012

(54) AUDIO DATA REPRODUCING METHOD AND PROGRAM THEREFOR

(75) Inventors: Taiko Yokoyama, Sagamihara (JP); Masaki Nakano, Machida (JP); Yoshiaki Morimoto, Kawasaki (JP)

(73) Assignee: Xanavi Informatics Corporation, Kanagawa (JP)

( * ) Notice: Subject to any disclaimer, the term of this patent is extended or adjusted under 35 U.S.C. 154(b) by 1032 days.

(21) Appl. No.: 11/634,961

(22) Filed: Dec. 7, 2006

(65) Prior Publication Data
US 2007/0171788 A1   Jul. 26, 2007

(30) Foreign Application Priority Data
Dec. 7, 2005 (JP) .................................. 2005-353625

(51) Int. Cl.
*G06F 17/00* (2006.01)
(52) U.S. Cl. ........................................................... 700/94
(58) Field of Classification Search .................... 700/94; 704/500–504
See application file for complete search history.

(56) References Cited

U.S. PATENT DOCUMENTS
7,228,229 B2 * 6/2007 Odagawa et al. ............. 701/211
2005/0020223 A1 * 1/2005 Ellis et al. .................. 455/186.1

FOREIGN PATENT DOCUMENTS
| JP | HEI05-344214 | 12/1993 |
| JP | 2002-521978 | 7/2002 |
| JP | 2004-016711 | 1/2004 |
| JP | 2004-180331 | 6/2004 |

* cited by examiner

*Primary Examiner* — Andrew C Flanders
(74) *Attorney, Agent, or Firm* — Antonelli, Terry, Stout & Kraus, LLP.

(57) ABSTRACT

Regarding first and second audio data to be reproduced simultaneously within a certain time period, a computer which has a storage device records the first audio data to the storage device within the period while at the same time reproducing only the second audio data, and, after having reproduced the second audio data, reproduces the first audio data while forcing its playback speed to increase with time. Whereby, the computer enables the two sets of audio data being reproduced simultaneously to be output in such a way as to provide a listener with enhanced audibility.

7 Claims, 11 Drawing Sheets

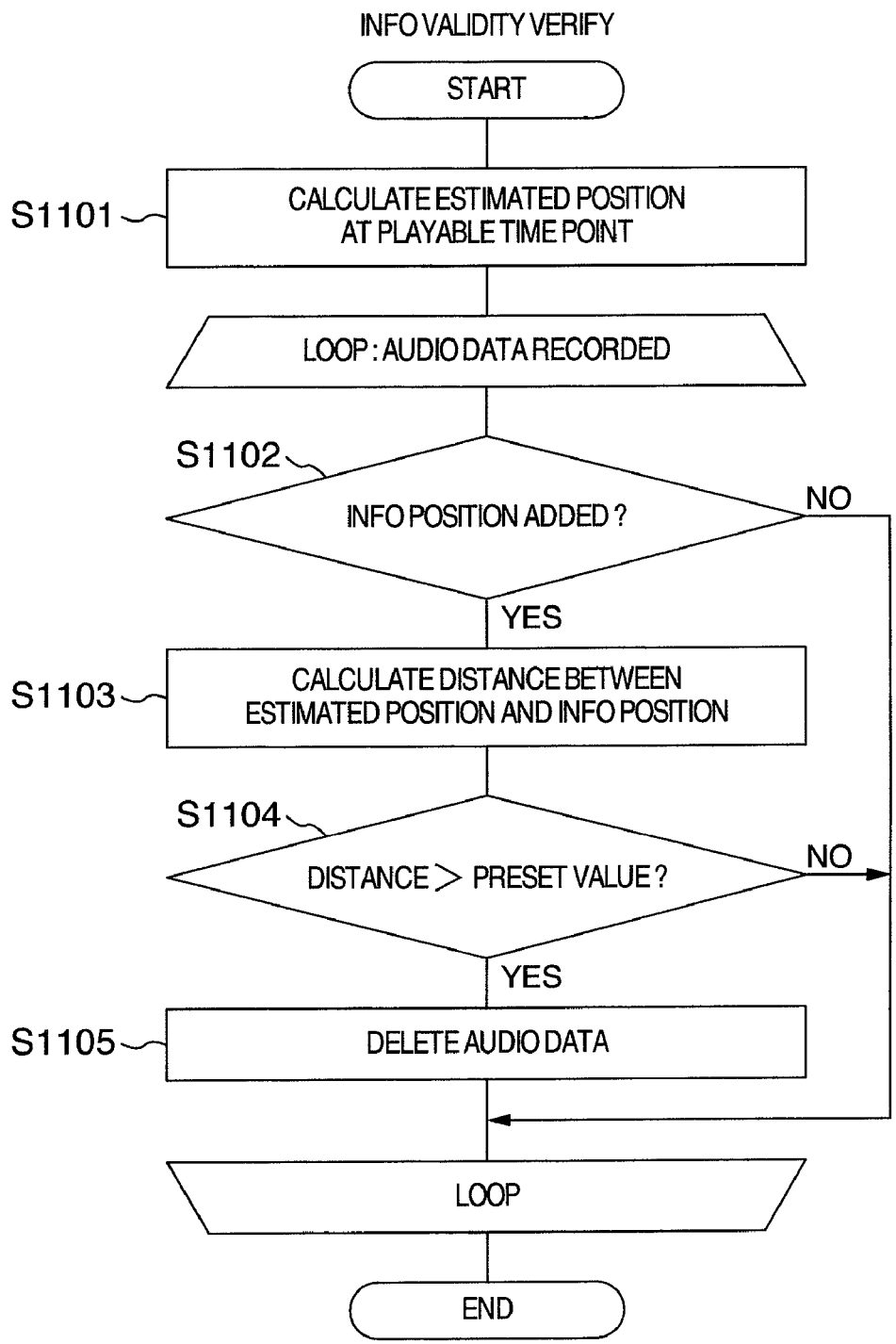

AUDIO DATA REPRODUCING METHOD AND PROGRAM THEREFOR

CROSS-REFERENCE TO RELATED APPLICATION

This application claims priority from Japanese Patent Application JP 2005-353625, filed on Dec. 7, 2005, the content of which is hereby incorporated by reference into this application.

BACKGROUND OF THE INVENTION

The present invention relates to an audio data reproduction method and a software program for use therewith.

Prior known in-vehicle terminal equipment employs techniques for preventing a driving person from failing to listen to navigation audio/voice sounds, which include a method for lowering or muting the volume of output audio sound or voice of an application program other than that for navigation. Additionally, JP-A-2004-016711 discloses therein a scheme for preferentially outputting navigation audio/voice sounds to a loud speaker unit for exclusive use of the driver.

In contrast, JP-A-2004-180331 discloses a technique for performing cut-down control of the reproduction time of recorded parts upon startup of viewing and listening to recorded video portions of the contents as have been recorded to a hard disk recorder or else, thereby to forcing the completion of playback of such recorded portions to be identical or "synchronized" with a finish time point of on-air contents on a real-time basis.

SUMMARY OF THE INVENTION

Even when attempts are made, as in the prior art, to lower the sound volume from an application program except the navigation or to switch between speaker outputs, if the audio sound as output from such the application program is a person's speaking voice, then there is the possibility that the navigation audio output is hard to listen due to blend with its background sounds. On the contrary, when the audio output is muted, the user will sometimes fail to listen to his or her interested information. Alternatively, in case the technique used in the hard disk recorder or the like as indicated in JP-A-2004-180331 is applied to in-vehicle terminals, the audio output from an application program is expected to be reproduced at high speeds by time-shortened or "cue" playback; however, the listener is still hard to hear such audio/voice sounds when the audio output suddenly becomes faster.

This invention has been made in view of the above-stated background, and its object is to provide an audio data reproduction method and program capable of outputting two sets of simultaneously reproduced audio data while achieving enhanced ear catchability for a listener.

In accordance with one principal concept of the invention for attaining the foregoing object, a method for reproducing two sets of first and second audio data to be simultaneously reproduced within a certain time period is provided, wherein a computer having a storage device records the first audio data to the storage device in the period while at the same time reproducing only the second audio data and, after having completed the reproduction of the second audio data, reproduces the first audio data while causing its reproduction speed to gradually increase with elapse of time.

According to this invention, it is possible to output the two sets of simultaneously reproduced audio data in a listener-friendly manner.

BRIEF DESCRIPTION OF THE DRAWINGS

FIG. 11 is a diagram showing a flow of information validity verify processing.

DESCRIPTION OF THE PREFERRED EMBODIMENTS

An explanation will be given of an in-vehicle terminal equipment 10 embodying this invention. The in-vehicle terminal 10 of this embodiment may illustratively be a so-called car navigation system. The in-vehicle terminal 10 is audio-outputtable and allows an application program for performing car navigation (referred to as navi-application hereinafter) and an application program for output of audio and voice sounds (referred to hereafter as audio application) to operate on the in-vehicle terminal 10. Examples of the audio application include, but not limited to, a chat application, a television broadcast receiver application, and an application for providing environmental/traffic information in a land area around the vehicle of interest, such as traffic congestion information or the like.

In this embodiment, in order to ascertain the listening of voice sounds of the navi-application (abbreviated as "navi-voice" hereinafter), the other voice sounds of the audio application (say, application voice) are prevented from being output during the output of the navi-voice while at the same time causing the other application voice of audio application to be recorded. An additional arrangement as used herein is to perform time-shortened reproduction of the recorded application voice after completion of the navi-voice reproduction, thereby to enable real-time execution of the output of its following application voice.

Figure 1:
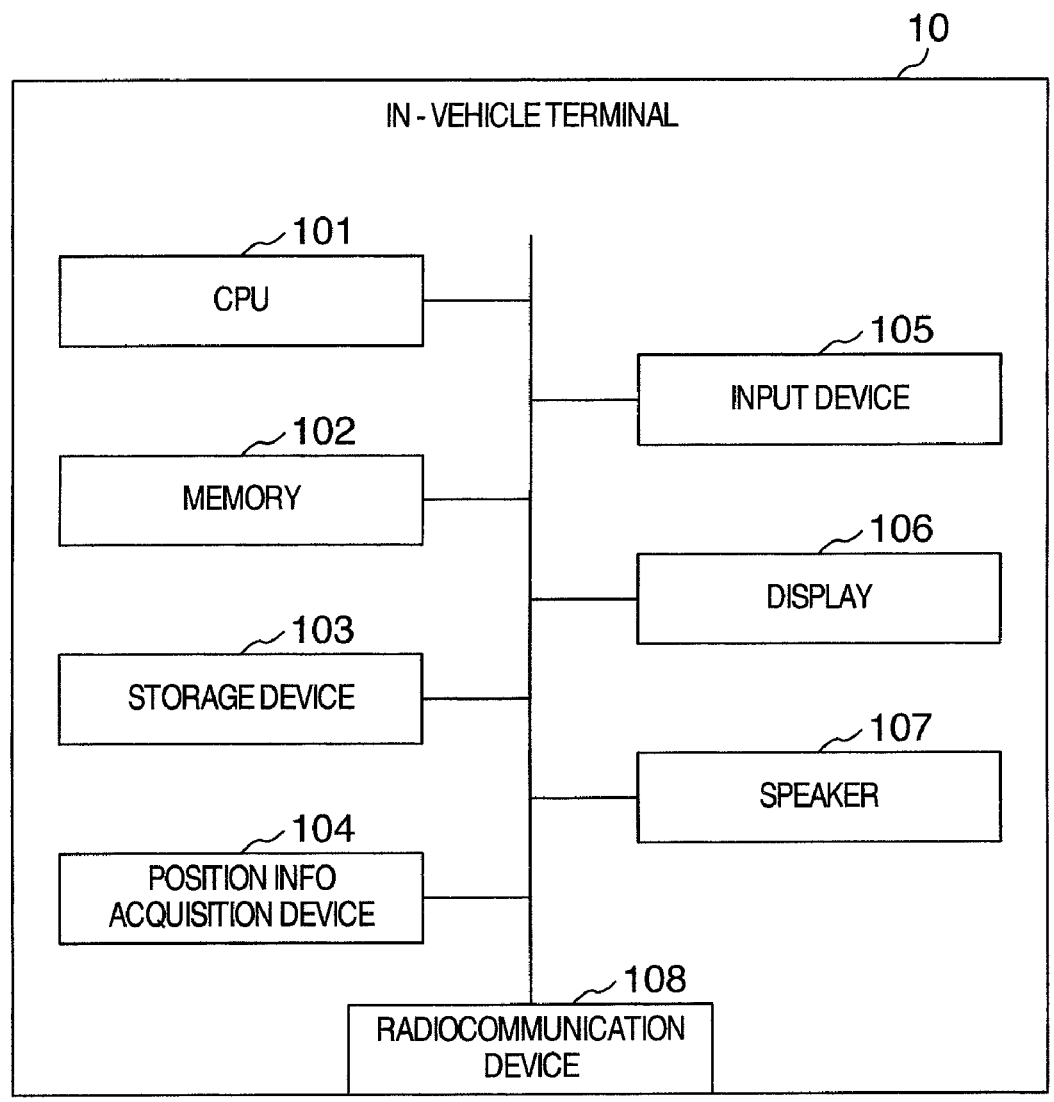
FIG. 1 is a diagram showing an entire configuration of an in-vehicle terminal 10 in accordance with an embodiment of the invention.

An overall configuration of the in-vehicle terminal 10 in accordance with this embodiment is shown in FIG. 1. As shown in FIG. 1, the in-vehicle terminal 10 includes a CPU 101, a memory 102, a storage device 103, a position information acquisition device 104, an input device 105, a display device 106, a loud speaker unit 107, and a radio-communication device 108.

The storage device 103 is for storing therein a software program and data; for example, this device is a hard disk drive (HDD), compact disc read-only memory (CD-ROM) drive, digital versatile disk read-only memory (DVD-ROM) drive or the like. The CPU 101 reads and executes the program stored in the storage device 103 to thereby realize various kinds of functions. The position information acquisition device 104 is a device for acquiring a present position of the movable body, such as a land vehicle with the in-vehicle terminal 10 being installed therein. An example of the position information acquisition device 104 is a global positioning system (GPS) receiver. The input device 105 is for entry of information. Examples of it are a touch panel, remote controller, microphone, keyboard, and mouse. The display device 106 is an information display panel or else. The radiocommunication device 108 is the one that performs over-the-air communication with another communication device. Additionally, the in-vehicle terminal 10 may be arranged to have a tough-panel display module with the input device 105 and the display device 106 being integrally combined together.

Figure 2:
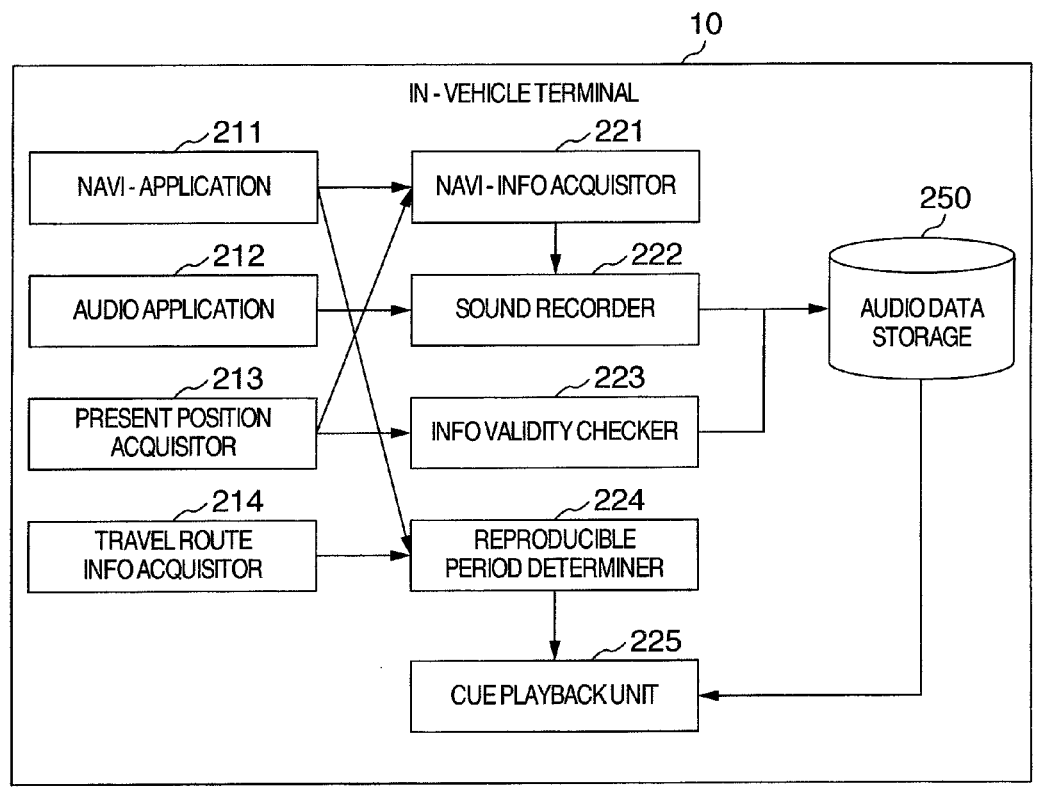
FIG. 2 is a functional block diagram of the in-vehicle terminal 10.

FIG. 2 is a functional block diagram of the in-vehicle terminal 10. As shown herein, the in-vehicle terminal 10 includes a navigation application 211, audio application 212, present position acquisition unit 213, travel route information acquisition unit 214, navigation information acquisition unit 221, sound recording unit 222, information validity verifying unit 223, reproduction enable time-period determination unit 224, time-shortened reproduction unit 225, and audio data storage unit 250. Note here that the navi-application 211, audio application 212, present position acquisition unit 213, travel route information acquisition unit 214, navi-info acquisition unit 221, sound recorder 222, information validity checker 223, reproduction enable period determinator 224 and shortened reproduction unit 225 are realizable in a manner that the CPU 101 of in-vehicle terminal 10 reads and executes the program being stored in the storage device 103 into the memory 102. Additionally the audio data storage unit 250 is realized as a storage region which is provided by the memory 102 or the storage device 103 of in-vehicle terminal 10.

The audio data storage unit 250 stores therein audio data as output from the navi-application 211 and the audio application 212. The sound recorder 222 performs the recording of application audio/voice sounds by letting the audio data as output from the audio application 212 be recorded to the audio data storage unit 250. Note that the audio data is added a time point at which the data is output from the audio application 212. The application voice is sometimes added a position relating to such application voice (referred to as information position hereinafter). For instance, the audio data of application voice to be output from the audio application 212, which receives via radiocommunication the advertisement information being sent over the air from a store along a street and then visually displays the received ad info on a map image, is added the position of such store. This information position is recorded in the audio data storage unit 250 in such a manner that it is added to the audio data. Recording the processing to be done by the sound recorder 222 will be described in greater detail later.

The navigation information acquisition unit 221 acquires from the navi-application the information as to navigation (referred to as navi info hereafter). Examples of the navi info include, but not limited to, an on-map position for the next startup of a navi voice and a playback time of the navi voice.

As will be described later, the sound recorder 222 is responsive to receipt of the navi info as acquired by the navi-info acquisition unit 221, for determining or "judging" whether the navi voice is reproducible until the next start of navi voice and, if it is impossible to reproduce any application voice, records the audio data of such application voice to the audio data storage unit 250.

The present position acquisition unit 213 obtains from the position information acquisition device 104 a present position of the movable body.

In case the audio data being recorded in the audio data storage unit 250 has a position added thereto, when a distance between such position and the present position is greater than a predetermined distance, the information validity checker 223 deletes such the audio data from the audio data storage unit 250. This processing of the info validity checker 223 will be described in detail later.

The travel route information acquisition unit 214 acquires information as to the traveling of the movable body (referred to as travel route information hereinafter). The travel route information contains a traveling speed of the movable body. In addition, the travel route information acquisition unit 214 performs total sum calculation processing based on the obtained travel route information to thereby compute the average traveling speed of the movable body. The travel route information acquisitor 214 is designable to periodically gain a present position of the movable body from the position information acquisition device 104 and then obtain its traveling speed and travel direction and others. Alternatively the travel route information acquisition unit 214 may be arranged to get the velocity information from a gyro sensor as built in the movable body. Although in this embodiment the travel route information is the information concerning the movable body's traveling velocity, this is not to be construed as limiting the invention and may alternatively be arranged to include, for example, traffic congestion information, the state of a signaler (such as the remaining time of a red traffic signal) and whether an emergency vehicle is approaching or not. In this case, the travel route information acquisition unit 214 is arrangeable to receive the travel route information and/or environmental information from another communications device through the radiocommunication device 108.

The reproduction enable time-period determinator 224 determines a time period capable of reproducing the audio data being recorded in the audio data storage unit 250, which period will be referred to as reproducible time period hereinafter. The reproducible period determiner 224 gains from the navi-application 211 a time point at which the output of navi-voice is planned and determines whether a time interval between respective navi-voices is greater than a specified threshold value to thereby judge whether the audio data is reproducible or not. A detailed description will be given later as to the method for determining the reproduction enable time period by the reproducible period determiner 224.

The time-shortened reproduction unit 225 performs time-shortened playback of the audio data being recorded in the audio data storage unit 250. This short-time reproducer 225 reproduces the audio data while forcing the reproduction speed or rate to gradually increase and, after arrival at a predefined playback speed, causing the reproduction speed to decrease gradually. Details of the audio data cue-reproduction processing by the reproducer 225 will be set forth later.

An explanation will next be given of the audio output processing in the in-vehicle terminal 10 of this embodiment. As previously stated, the illustrative in-vehicle terminal 10 is arranged to output navi voice with priority given thereto while at the same time recording application voice from another application program without outputting it from the loud speaker and then, after completion of the output of the navi voice, performing time-shortened playback of the application voice recorded.

Figure 3:
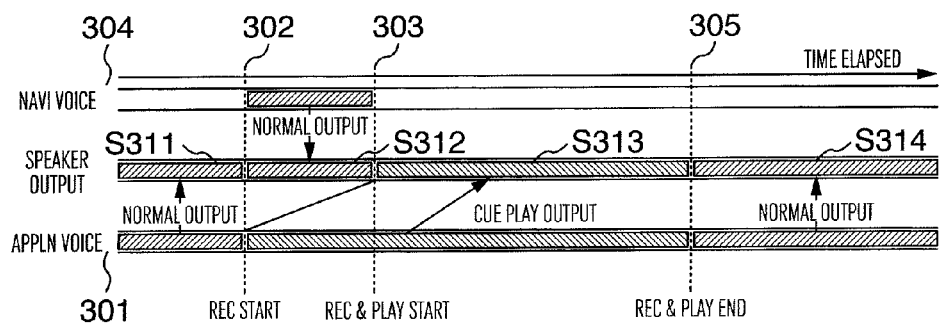
FIG. 3 is a diagram for explanation of a situation of audio output by the in-vehicle terminal 10 of this embodiment.

FIG. 3 is a diagram for explanation of a situation of audio output by the in-vehicle terminal 10 of this embodiment. In FIG. 3, application voice 301 is being continuously output from the audio application 212 whereas navi voice 304 is output within a time interval between time points 302 and 303.

Up to the time point 302 at which the output of the navi voice 304 gets started, the application voice 301 is directly reproduced from the speaker (at step S311); however, after the instant 302, only the navi voice 304 is reproduced (S312). During such period, the application voice 301 is recorded. After the instant 303 at which the output of navi voice 304 is completed, the recording of the application voice 301 is continued and simultaneously time-shortened reproduction of the recording-completed application voice 301 is performed while increasing the playback speed thereof (S313). Due to this short-time playback, after an instant 305 at which every part of the recorded application voice 301 is reproduced, the application voice 301 to be output from the audio application is reproduced directly in a native way (S314).

In light of the nature of the navi-application, it hardly happens that a single audio output session continues for a long time. It is also very unlikely that a situation is continued which experiences frequent occurrence of such output. In other words, the navi voice is such that its non-output time period is longer than the output period thereof in many cases. Consequently, it is permissible that the cue playback of the application voice as recorded during outputting of the navi voice is carried out for a relatively short time.

Figure 4:
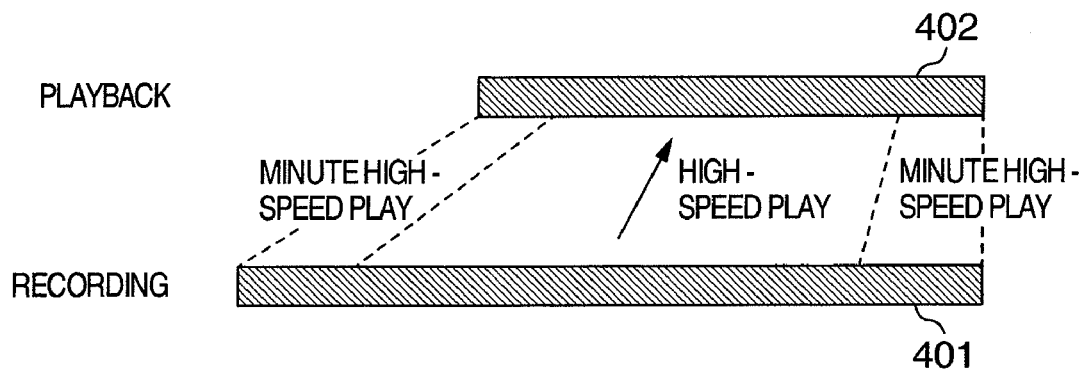
FIG. 4 is a diagram for explanation of a situation of time-shortened reproduction of application audio/voice sound 301 which has already been recorded.

Further, in the in-vehicle terminal 10 of this embodiment, in the time-shortened or cue playback (S313) of the recorded application voice 301 to be performed after completion of the reproduction of navi voice 304, it is arranged as shown in FIG. 4 that the reproduction speed is gradually raised after startup of the reproduction (that is, the playback rate is increased with elapse of time) and, just before the completion of the reproduction of application voice 301, the playback rate is gradually lowered (i.e., the playback rate is reduced with time). If the reproduction gets started while letting the application voice 310 suddenly increase in playback rate, the listener is hard to hear and catch the application voice until his or her ears get ready for the listening. However, by gradually increasing the playback speed in the way stated above, it is possible to enhance the ear catchability as to the listening-begun part of the voice. In addition, by gradually lowering the playback rate prior to completion of the cue reproduction to cause it to come closer to the normal speed, it is possible for the listener to catch more smoothly the ordinary output of the application voice.

It should be noted that the gradual rise-up (or, drop-down) of the playback speed refers to an attempt to increase (or decrease) the playback rate to thereby permit it to finally reach a prespecified playback rate. In this embodiment, for brevity purposes, the gradual increase of playback rate should be interpreted to mean that the playback rate is forced to exhibit a monotone increase—in this case, a playback speed v1 at a first time point and a playback speed v2 at a second time point after the first instant are set to satisfy a relationship of "v1≦v2." Similarly the gradual decrease of playback rate means forcing the playback rate to simply decrease at a constant change rate: in this case, the playback speeds v1 and v2 satisfy a relationship of "v1≧v2."

The audio output processing to be done by the in-vehicle terminal 10 of this embodiment will be described in greater detail below.

Figure 5:
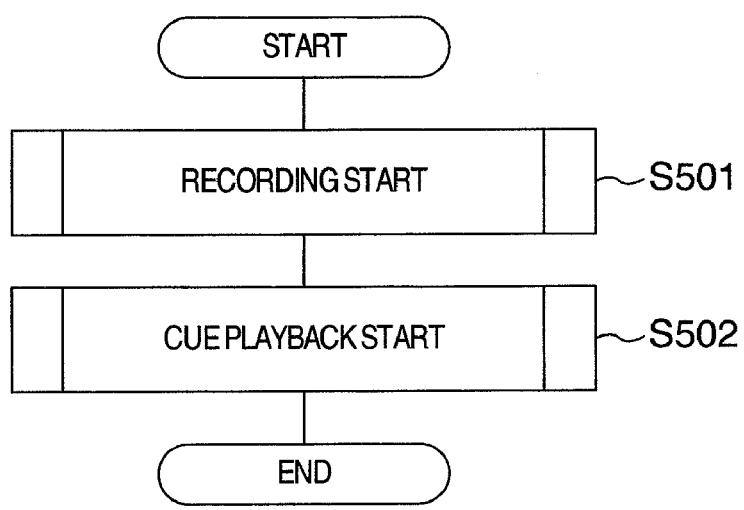
FIG. 5 is a diagram showing a flow of startup processing of the in-vehicle terminal 10.

FIG. 5 is a diagram showing a flow of startup processing of the in-vehicle terminal 10. As shown herein, the in-vehicle terminal 10 executes the program as stored in the storage device 103 to start a sound recording procedure as will be later described (at step S501), and then starts time-shortened reproduction or "cue playback" processing (S502). These processes are performed simultaneously in a parallel way in the in-vehicle terminal 10.

Figure 6:
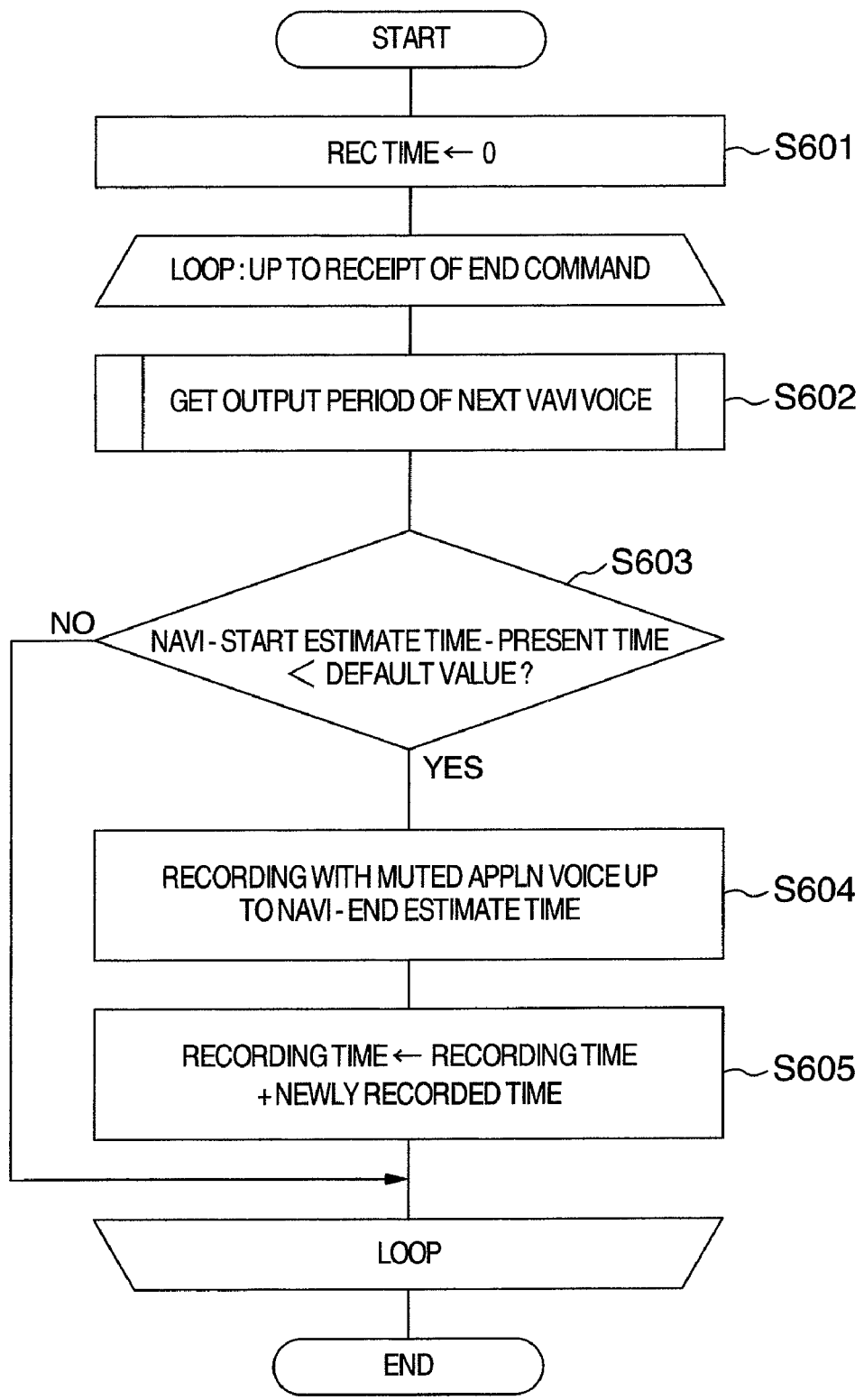
FIG. 6 is a diagram showing a flow of sound recording processing.

A flow of the sound recording processing is shown in FIG. 6. The sound recorder 222 of the in-vehicle terminal 10 initializes the recording time to "zero (0)" (at step S601) and then performs the following processing until receipt of an end instruction from the user.

Figure 7:
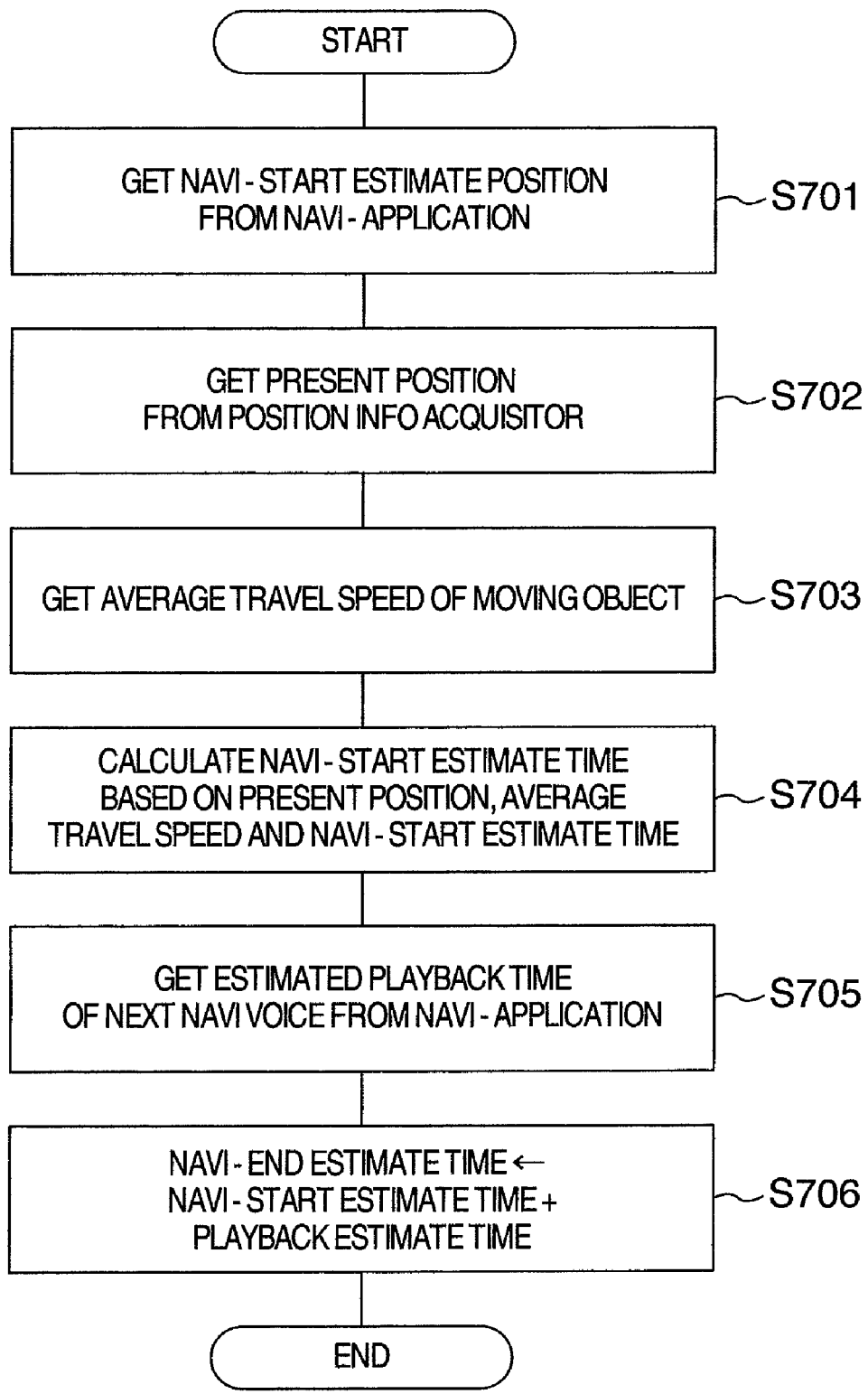
FIG. 7 is a diagram showing a flow of navigation voice output time-period acquisition processing.

The navi-info acquisition unit 221 of in-vehicle terminal 10 performs navi-voice output period acquisition processing shown in FIG. 7 (S602).

As shown in FIG. 7, the navi-info acquisition unit 221 next acquires a position of the movable body at which navi voice is expected to be output (referred to as the navi start estimate position hereinafter) from the navi-application 211 (at step S701). The present position acquisition unit 213 obtains a present position of the movable body from the position information acquisition device 104 (S702). The travel route information acquisition unit 214 gains an averaged traveling speed of the movable body (S703). The navi-info acquisitor 221 calculates a time point at which the navi voice is expected to begin to be output (hereafter, referred to as navi start estimate time) based on the present position of movable body and the average travel speed along with the navi start estimate position (S704). The navi-info acquisitor 221 gains from the navi-application 211 the next navi-voice playback estimate time (S705) and then computes a navi end estimate time point by adding the playback estimate time to the navi start estimate time point calculated (S706).

In this way, the navi-info acquisitor 221 acquires from the navi-application 211 an output time period of navi voice to be next performed.

Next, the sound recorder 222 calculates a difference between the navi start estimate time and a present time point. If this difference is more than or equal to a predefined value (i.e., YES at step S603 in FIG. 6), then store (record) the audio data of application voice to be prepared by the audio application within a time period up to the navi end estimate time point without reproducing the audio data (with muting applied thereto) (S604). The sound recorder 222 measures a time as taken for the above-noted recording and then adds the measured time to the recording time (S605).

Figure 8:
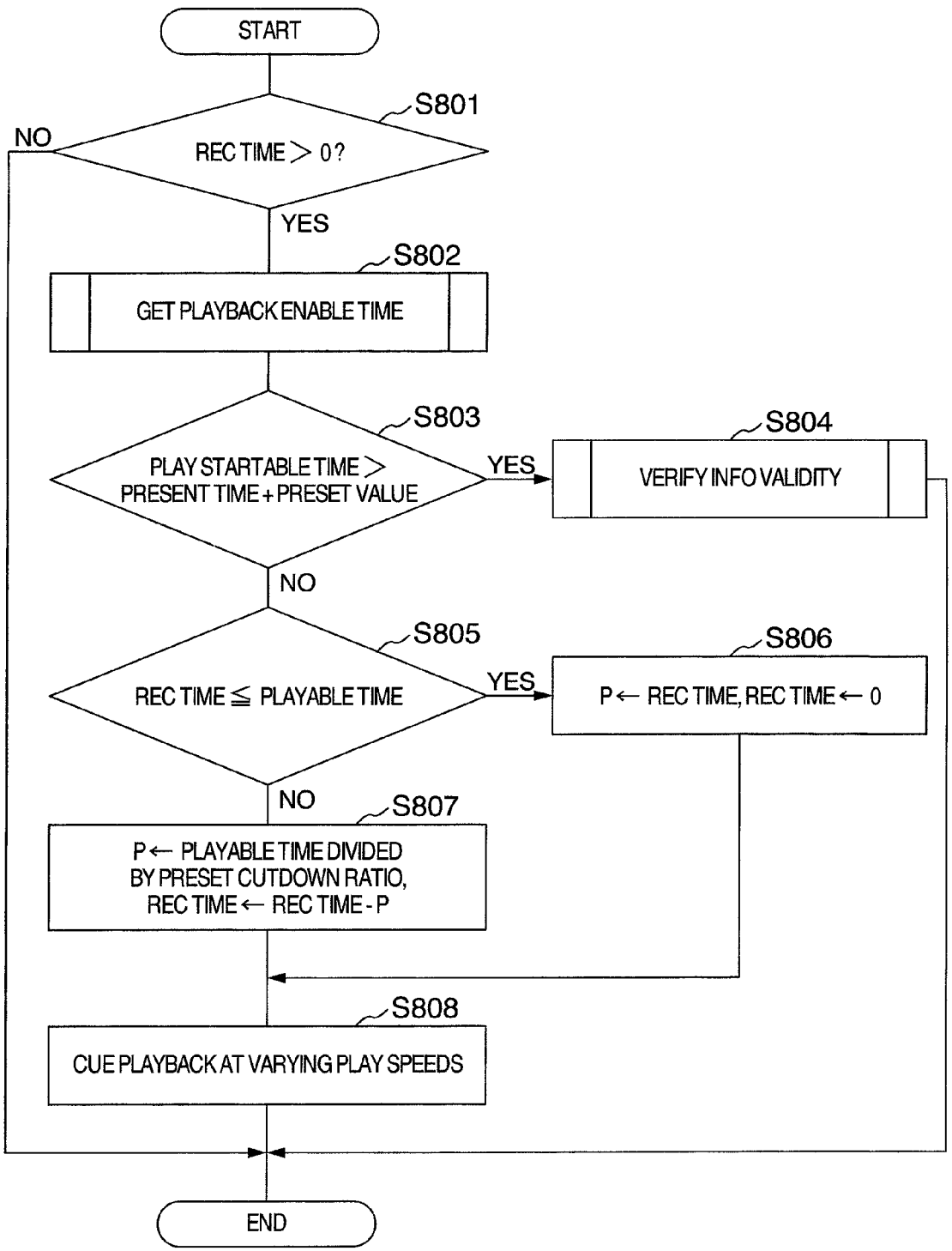
FIG. 8 is a diagram showing a flow of the processing for shortened reproduction of the application voice recorded.

See FIG. 8, which shows a flow of the processing for time-shortened or "cue" reproduction of the application voice recorded.

Figure 9:
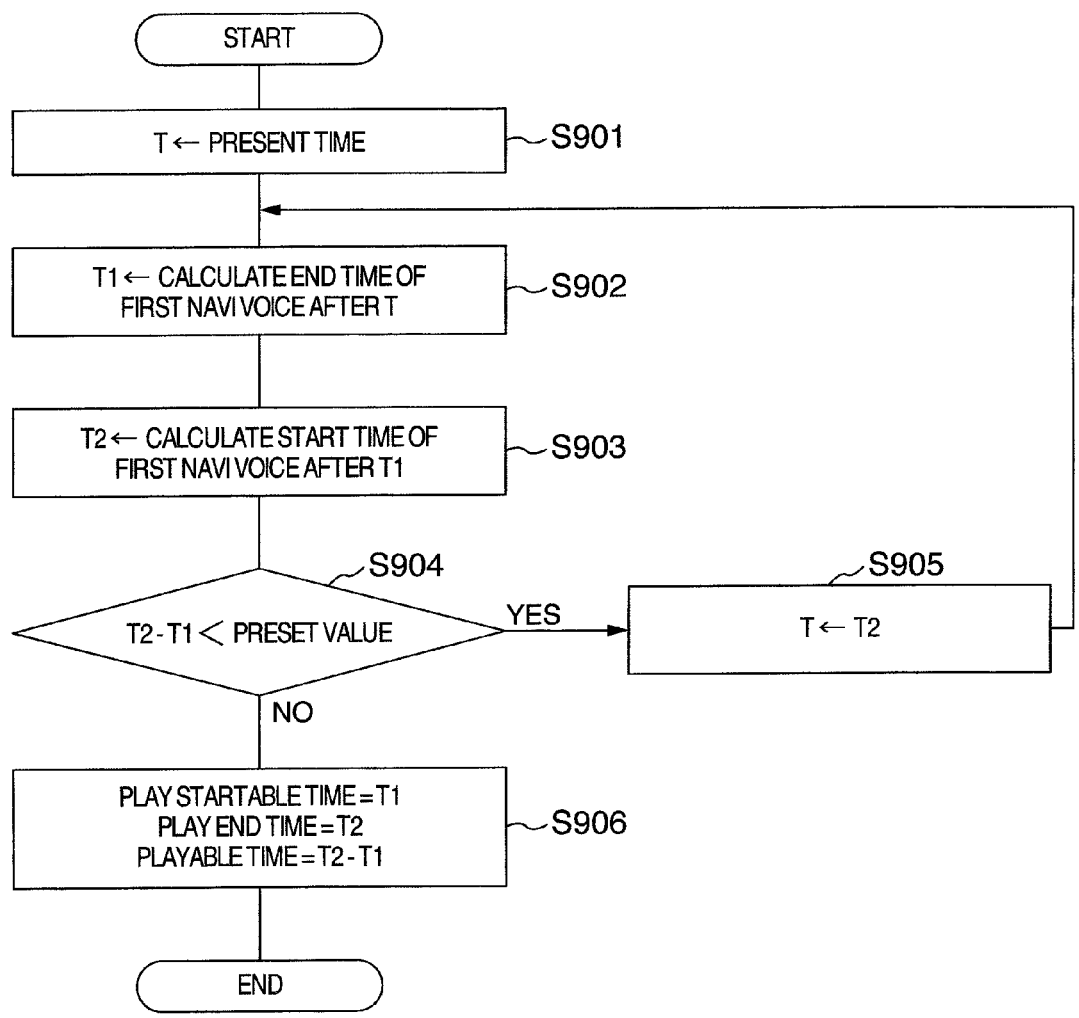
FIG. 9 is a diagram showing a flow of the processing for determining an application voice playback enable period.

In case the recording time being updated by the sound recorder 222 in the above-noted way is greater than "0" (YES at step S801), the reproducible period determiner 224 of the in-vehicle terminal 10 determines a reproduction enable time period by a process for determination of a reproduction enable period of the application voice shown in FIG. 9 (S802).

As shown in FIG. 9, the reproducible period determiner 224 sets a present time point to T (at step S901) and then calculates a time point at which the navi voice is first ended after the present time T and next sets it at T1 (S902). The navi-voice end estimate time is calculable based on a present position of the movable body, the average travel speed, the navi start estimate position and the navi voice playback time in a similar way to the above-stated processing of FIG. 7. Next, the reproducible period determiner 224 calculates an estimate time whereat navi voice is first started after the time point T1, which is given as T2 (S903). This navi-voice start estimate time may also be calculated based on the present position of the movable body, average travel speed and navi start estimate position in a similar way to the processing of FIG. 7. In case the length of a time period as obtained by subtraction of the time point T1 from the time point T2 (referred to as the "gap" period hereinafter) is less than a predefined value, that is, when it is expected that two separate navi voices are output consecutively with a short interval being interposed therebetween (S904), the reproducible period determiner 224 recurrently performs the processes at steps S905, S902 and S903 while letting T2 be T, until the length of the gap period becomes larger than or equal to the predefined value.

On the other hand, if the length of the gap period is more than or equal to the predefined value (NO at S904), let the time point T1 be the reproduction start enable time, let T2 be the reproduction end time, and let the length of gap period be the reproduction enable time (S906).

Figure 10A:
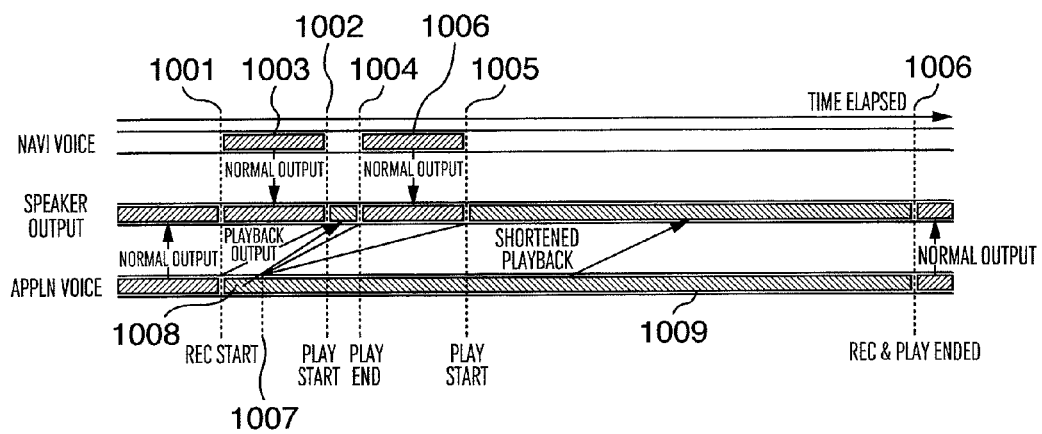
FIGS. 10A and 10B are diagrams for explanation of a situation for output of two sets of navigation audio/voice sounds.
Figure 10B:
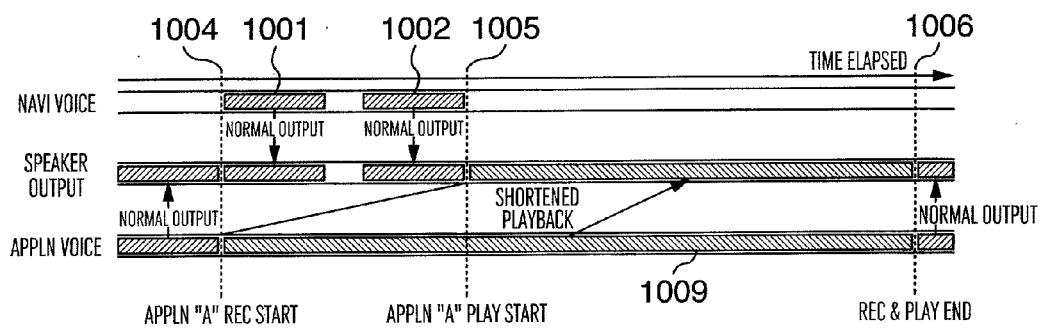

In the way stated above, depending upon whether the gap period between two adjacent navi voices is greater than the prespecified time, decision is made as to whether the audio data as recorded in such period is reproduced or not. FIG. 10 is a diagram for explanation of a situation of two navi voices being output. In FIG. 10, navi voice 1003 to be output within a time period of from a time point 1001 to a time point 1002 and navi voice 1006 to be output within a period between time points 1004 and 1005 are scheduled. If a gap period between the instants 1002 and 1004 is greater than or equal to a predefined value, time-shortened reproduction, i.e., cue playback, is performed relative to application voice 1008 that has been expected to be output within a period of from the instant 1001 to instant 1007, as shown in FIG. 10A. On the contrary, if the above-noted gap period is less than the predefined value, then the application voice is no longer output even within the gap period of the instants 1002 and 1004; otherwise, as shown in FIG. 10B, cue playback of the application voice 1009 recorded is performed from the instant 1005 at which output of the second navi voice is completed.

In case the reproduction startable time point thus determined in this way precedes a time point that is obtained by adding a predetermined time (e.g., one minute) to a present time point (YES at step S803), the information validity checker 223 performs information validity verify processing shown in FIG. 11 (S804).

The information validity checker 223 calculates a predicted position of the movable body at the reproduction startable time point (S1101). This predicted position is calculable, for example, based on a present position obtained by the present position acquisitor 213 and an averaged travel speed of the movable body as acquired by the travel route information acquisitor 214. The info validity checker 223 performs the following processing for a respective one of the audio data being recorded in the audio data storage unit 250.

In case the recorded audio data is added a position (referred to hereafter as information position) (i.e., if YES at step S1102), the info validity checker 223 calculates a distance between the information position added and the above-noted predicted position (S1103). If the distance calculated is larger than a prespecified distance (YES at S1104) then delete such audio data from the audio data storage 250 (S1105). Note that the distance to be calculated here may be a straight-line distance or, alternatively, a moving distance along the travel route of the movable body to be determined by using a scheme employed in the navigation system.

Figure 12:
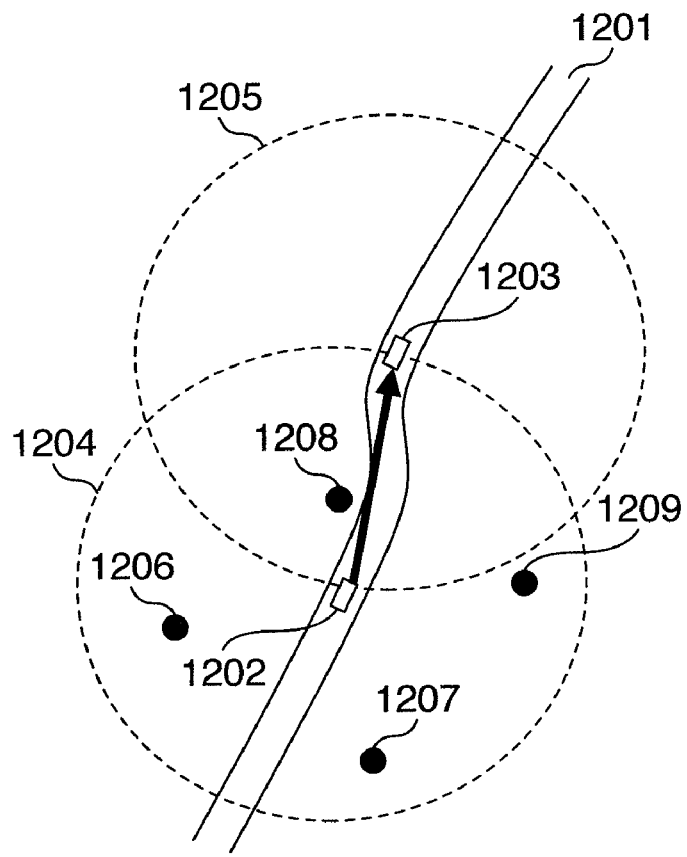
FIG. 12 is a diagram for explanation of a situation that a movable body is travelling.

In the procedure above, in case the position of the movable body at the audio data reproducible time point and the position added to such audio data are greater than or equal to a prespecified distance, such audio data will no longer be output. Thus it is possible to prevent outputting of certain audio data which would be in deep relationship with the position of the movable body and which decline in value for reproduction with progress in traveling of the movable body. FIG. 12 is a diagram for explanation of a situation that the movable body is travelling. FIG. 12 shows a situation that a land vehicle runs on a road 1201. Suppose here that in the in-vehicle terminal 10, the audio application 212 is rendered operative to audibly announce the information of stores and shops near or around the vehicle. At an instant that the land vehicle arrived at a position 1202, the audio data for giving the store information about stores 1206 to 1209 which locate within a land zone 1204 that is encompassed within a prespecified distance from the position 1202 (namely, store audio data) are output from the audio application 212. At that time, if navi voice is being output, audio data of these stores are recorded to the audio data storage unit 250 together with the positions of such stores. Assuming that the vehicle has arrived at a position 503 at the time the outputting of navi voice was completed, the audio data concerning the stores 1206, 1207 and 1209 which reside outside of a land area 1205 within the prespecified distance from the position 503 are deleted together from the audio data storage 250 by the above-noted information validity verify processing. Whereby, it is possible to shorten the length of a time required to reproduce the audio data. Note here that this audio data deletion is less in disbenefit to the listener because it is considered that the audio data of those stores which become far from the position of the vehicle due to its traveling are no longer beneficial in many cases.

On the other hand, in FIG. 8, in case the reproduction startable time point is before the instant at which the specified time is added to a present time point (NO at S803), the cue playback unit 225 judges whether the recording time as updated by the sound recorder 222 is greater than the reproduction enable time (YES at S805). If the record time is greater than the reproducible time then let the record line be P and set "0" to the record time (S806). If the record time is less than or equal to the reproducible time (NO at S805), let a quotient of division of the reproducible time by a predetermined cutdown ratio be a data length P of audio data to be subjected to the time-shortened reproduction or cue playback, and subtract P from the recording time (S807). Note here that the predetermined cutdown ratio is a ratio of a time taken to perform the cue playback of audio data as will be later described to a time need for the normal playback. An example is that when the cue playback is performed within a time period which is one-half of the normal playback, the predefined cutdown ratio becomes "0.5." Accordingly, in case the cue playback is done with the defined cutdown ratio of "0.5" in the reproducible time, P becomes "2" so that audio data having a length two times greater than the usual will be quickly reproduced at a doubled rate.

For the audio data with the length P thus determined in this way, the cue playback unit 225 performs time-shortened reproduction at varying playback speeds (S808).

Figure 13:
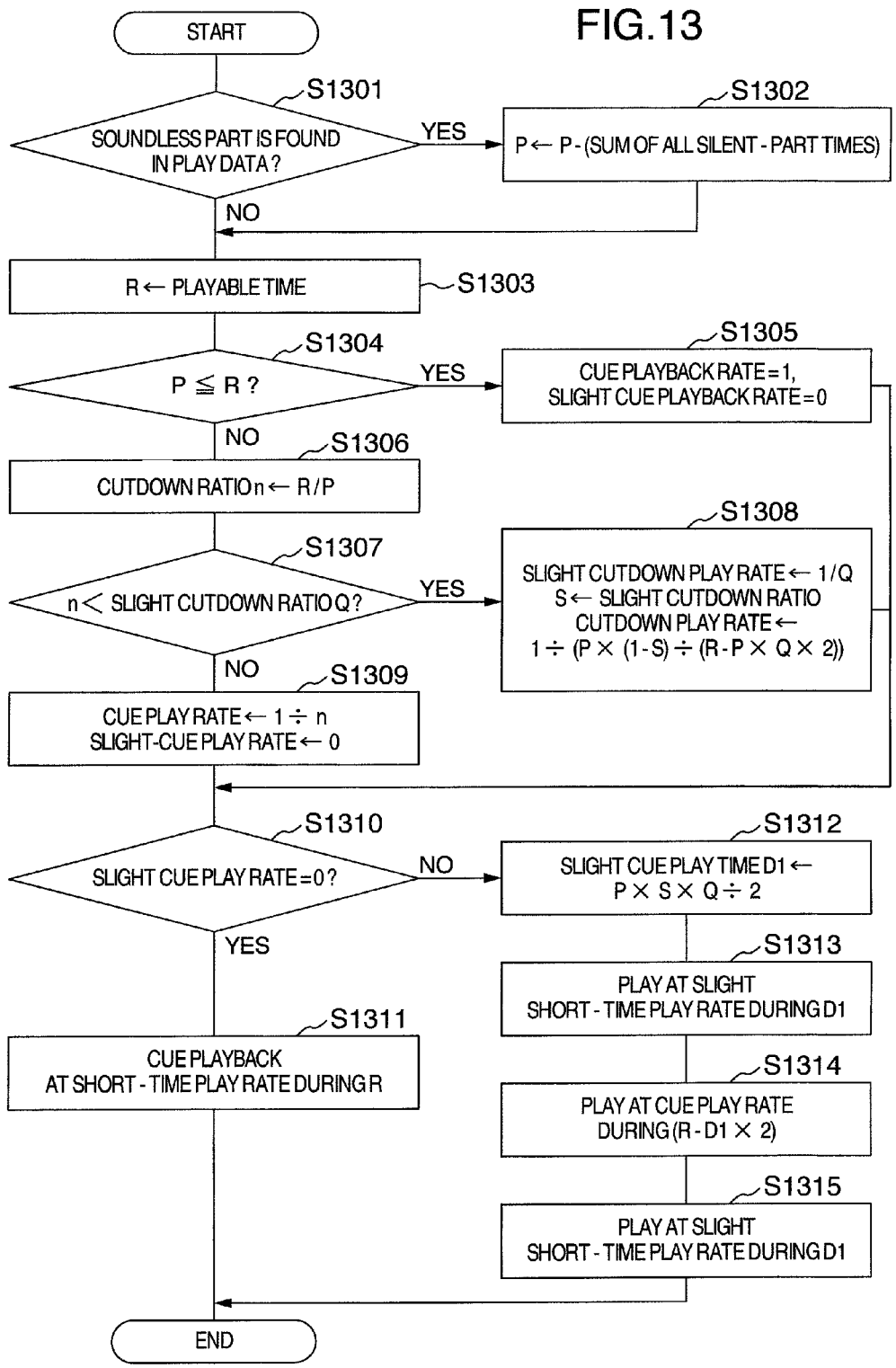
FIG. 13 is a diagram showing a flow of shortened reproduction processing with its playback speed being varied.

FIG. 13 is a diagram showing a flow of time-shortened reproduction processing with variable playback speeds. In this embodiment, the playback rate is variable in two steps. Also note that in this embodiment, the "cue" reproducer 225 operates to reproduce audio data at a playback speed that is faster by a one step from the time-shortened reproduction normal speed (referred to as slightly time-shortened reproduction rate hereinafter) within a specified time period from a processing startup time point as in the above-noted way shown in FIG. 4 and then reproduce the audio data at a different playback rate which is further faster by one step from the slightly time-shortened playback rate (referred to hereafter as time-shortened reproduction rate) and next perform reproduction at the slightly time-shortened playback rate up to an end time point. Additionally in the explanation below, a ratio of a time required for reproduction of audio data at the slightly time-shortened playback rate versus a time taken for reproduction of audio data at the normal speed (real time) is called the "slight cutdown" ratio.

Figure 14:
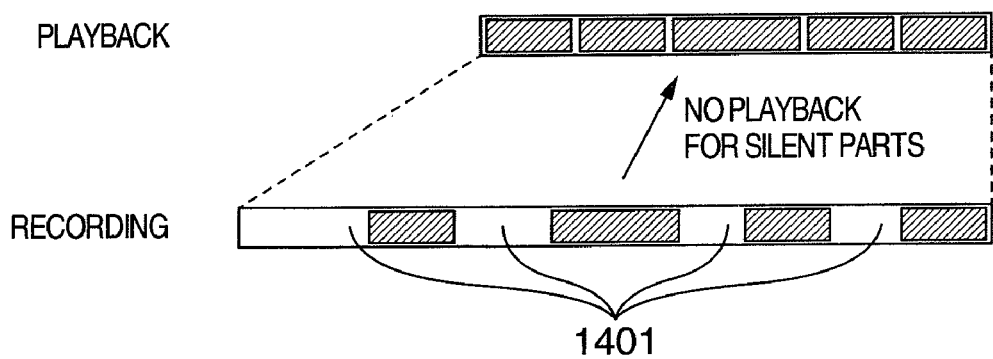
FIG. 14 is a diagram for explanation of a state that soundless portions are contained in the data to be reproduced.

The cue reproducer 225 reads data (called the to-be-reproduced data hereinafter) with the data length P from the beginning of the audio data being stored in the audio data storage 250 and then checks and determines whether soundless intervals are contained in the to-be-reproduced data thus read (S1301). In this embodiment, the soundless intervals contained in the to-be-reproduced data are skipped and excluded from reproduction. FIG. 14 is a diagram for explanation of a situation that soundless or "silent" intervals are contained in the to-be-reproduced data. As shown herein, when silent intervals 1401 are contained in the audio data of the application voice recorded, the cue reproducer 225 prevents playback of these silent intervals 1401. This makes it possible to reproduce the recorded application voice within a shorter length of time period.

In case the soundless intervals are contained in the to-be-reproduced data (YES at step S1301), the cue reproducer 225 subtracts from P a total length of silent intervals being excluded from the reproduction (S1302).

The cue reproducer 225 sets the reproducible time as R (S1303). When the length of to-be-reproduced data is less than the reproducible time, that is, if P is less than or equal to R (YES at step S1304), let the time-shortened reproduction speed be "1" and the slightly time-shortened reproduction rate be "0" (S1305).

In contrast, if P is greater than R (NO at step S1304), the cue reproducer 225 sets a value of R divided by P to a cutdown ratio n (S1306). When n is larger than or equal to the slight-cutdown ratio Q (YES at S1307), the cue reproducer 225 defines a value of 1 divided by Q to be the slightly time-shortened playback speed and then calculates a time-shortened playback rate which is given as "$1/(P \times (1-S)/(R-P \times Q \times 2))$", where S is the ratio of the length of data to be reproduced at the slightly time-shortened playback rate versus the total length of entire audio data (referred to hereinafter as slight-cutdown ratio) (S1308). If n is more than or equal to Q (NO at S1307), the cue reproducer 225 sets a value of 1 divided by n as the time-shortened playback rate while letting the slightly time-shortened playback rate be "0" (S1309).

If the slightly time-shortened playback rate thus calculated in this way is "0" (YES at S1310), the cue reproducer 225 does not perform the time-shortened reproduction at the slightly time-shortened playback rate but performs the shortened reproduction at the shortened playback rate within the time R (S1311).

If the slightly time-shortened playback rate is not "0" (NO at S1310), the cue reproducer 225 calculates by "$P \times S \times S/2$" a time D1 for reproduction at the slightly time-shortened playback speed (referred to hereafter as slightly shortened reproduction time) (S1312), reproduces the to-be-reproduced data at the slight cutdown playback rate within the slightly shortened reproduction time (S1313), reproduces for the time calculated by $(R-D1 \times 2)$ (S1314), and reproduces at the slight cutdown playback rate for the slight cutdown reproduction time (S1315). Note that at the steps S1311 and S1313 to S1315, the cue reproducer 225 skips any soundless intervals as contained in the to-be-reproduced data and abandons reproduction thereof.

In the above-stated way, the in-vehicle terminal 10 of this embodiment is capable of outputting, in case the navi voice and the application voice from another audio application 212 overlap together, only the navi voice while muting those application audio/voice sounds other than the navi voice during outputting of the navi voice. Thus it is possible to create the situation that permits the listener to easily listen to the navi voice. This in turn makes it possible to ensure that the listener can catch the navi voice without difficulties. It is also possible for the navi-application 211 to reliably make information communications with the listener.

Also importantly, the audio data of application voice is recorded to the audio data storage 250 during muting of the application voice (during output of the navi voice), and the audio data recorded will be reproduced after having completed the playback of the navi voice. Accordingly, it is possible to prevent loss of information to be provided to the listener, since the information transfer from application voice to be lost due to the muting of the application voice during outputting of the navi voice is performed after the output of navi voice. Whereby, it is possible to avoid unwanted occurrence of situations such as for example the drop-off of the context of a talked story due to the failure of listening to the dialog contents such as chatting, thereby enabling enhancement of the convenience of the listener(s). In addition, since the application voice is fast reproduced at an increased playback speed, rapid recovery is achievable so that the timing for output of the application voice becomes on a real-time basis.

Additionally, as the in-vehicle terminal 10 of this embodiment performs the time-shortened reproduction while varying the playback rate in steps, it is possible to secure ear-catchability owing to smooth changes in playback speed. It is also possible to lighten the uncomfortable feeling that the listener might have when the application voice suddenly begins to be reproduced at a high speed.

In addition, since the playback speed is gradually lowered to come closer to the normal playback speed at the termination of the time-shortened reproduction of application voice, the time-shortened playback is switched to the reproduction of application voice on a real-time basis so that it is possible to smoothly perform it without causing the user to become aware of it. This makes it possible to suppress degradation in amenity of the listener.

Additionally in case the distance between a position added to the audio data and a present position of the movable body becomes greater than or equal to a prespecified value, the in-vehicle terminal 10 of this embodiment deletes such the audio data. Consequently, in an exemplary situation that certain information such as the information of a store along a street decreases in value as the distance becomes far away, it becomes possible by omission of provision of such worthless information to start more rapidly the reproduction of the other application voice(s). In addition, since the in-vehicle terminal 10 of this embodiment is capable of suppressing an increase in reproduction rate as the audio data recorded becomes less in information amount (time), it is possible by deletion of audio data low in information value to quickly reproduce audio data high in information value while attaining increased ear catchability.

In addition, the in-vehicle terminal 10 of this embodiment is specifically arranged to eliminate reproduction of any application voice in cases where a time interval of from the navi voice playback completion to startup of the next navi-voice reproduction is short. Thus it is possible to avoid the occurrence of a situation that the application voice is broken apart needlessly due to playback of pieces of the application voice within an extra-short time period.

Although in this embodiment the reproduction speed is designed to change in two steps, this is not the exclusive one: it may be modified to change in more than three steps or alternatively smoothly change to exhibit simple increment. Still alternatively, the degree of such change may be varied between the case of an increase in reproduction rate from the beginning of the playback start time point and the case of the reproduction rate being reduced from the time-shortened playback rate to the normal speed.

Additionally the in-vehicle terminal 10 may be arranged to acquire, during calculation at the navi start estimate time point, travel route information such as the remaining time of a red traffic signal and a time period of from the approach of an emergency vehicle to its passage and calculate from the acquired travel route information the length of a stoppage time of the car and then build thereinto the stoppage time thus calculated. In this case the navi start estimate time point becomes later in many cases than a value calculated by the processing that was explained in this embodiment. Accordingly, it is possible to perform prediction which reserves an increased length of time usable for reproduction of the application voice. In addition, in the processing as discussed in this embodiment, the reproduction speed ate of application voice becomes to vary more slowly with an increase in reproduction enable time; thus, calculating the reproducible time by use of the above-stated travel route information makes slower the change of reproduction rate, thereby enabling alleviation of the listener's uncomfortable feeling as to changeover of application voice.

Although in this embodiment any soundless intervals contained in the data being reproduced are designed to be skipped, it may alternatively arranged to shorten such soundless intervals to have a predetermined length of time (e.g., 0.5 seconds). This in turn makes it possible to express break points of the application voice in cases where the soundless intervals indicate the break points of continuous application voice. Note that in this case, the step S1302 in the above-stated processing of FIG. 13 is modified to subtract from P a total sum of the lengths of such soundless intervals and thereafter add a value with the number of soundless intervals being multiplied by the above-noted predetermined length of time.

Additionally the in-vehicle terminal 10 may be arranged to judge whether a respective one of the audio data being stored in the audio data storage 250 is music data or not and then reproduce such music audio data while causing the data to be kept lower in sound volume than the remaining audio data. In this case, it is possible to enhance the listenability of the audio data other than music. It is also permissible to prevent reproduction of the audio data as judged to be music. Note that the judgment of whether music data or not may be made while referring to header information of audio data by way of example or, alternatively, may be designed to obtain from the audio application 212 the information indicative of whether music data or not.

Additionally, each functional unit of this embodiment may be installed as the function of the navi-application 211.

Although in this embodiment no specific explanations are given as to pitch/tone variations of audio/voice sounds occurring due to changes in reproduction rate, appropriate utilization is needed on a case-by-case basis in order to realize reproduction without the sense of discomfort.

Also note that while in the embodiment the gradual riseup of playback speed is designed to be a constant increase in playback rate, this is not to be construed as limiting the invention and may alternatively be arranged so that the playback rate temporarily decreases in mid course as far as the playback rate is increased to finally reach a prespecified playback rate. Similarly it is also permissible that during gradual reduction of playback rate, the playback rate may temporarily increase en passant.

Although the present invention has been described with reference to specific embodiments, the description is illustrative of the invention and is not to be construed as limiting the invention. Various modifications and applications may occur to those skilled in the art without departing from the gist of the invention, while letting equivalents be involved therein.

While the description is drawn to the illustrative embodiments, this invention should not be limited thereto, and it is apparent to those skilled in the art that various changes and alterations may be made within the spirit of the invention and the coverage of the appended claims.

The invention claimed is:

1. An audio data reproduction method for interrupting current reproduction of first audio data, for reproducing second audio data targeted to be reproduced simultaneously within a same certain time period of first audio data reproduction, said method causing a computer having a storage device to self-perform a process comprising:
at the time period, temporarily interrupting the first audio data reproduction, and beginning reproducing the second audio data;
recording within said time period, the first audio data to said storage device while reproducing the second audio data only;
after completion of reproduction of said second audio data, resuming reproducing said first audio data while forcing a reproduction speed of the first audio data reproduction to increase with elapse of time; and
planning a reproduction start time point of third audio data to be reproduced after completion of the reproduction of said second audio data;
calculating a reproduction end time point of said second audio data;
calculating a gap time being a time period of from said reproduction end time point to said reproduction start time point;
calculating a reproduction time needed for reproduction of said first audio data while increasing the reproduction speed thereof;
determining whether the calculated reproduction time is less than or equal to said gap time; and
only in a case where said reproduction time is less than or equal to said gap time, reproducing said first audio data while increasing said reproduction speed.

2. The method according to claim 1, wherein said computer increases said reproduction speed in such a way that said reproduction time becomes the longest within a range that said reproduction time does not exceed said gap time.

3. An audio data reproduction method for interrupting current reproduction of first audio data, for reproducing second audio data targeted to be reproduced simultaneously within a same certain time period of first audio data reproduction, said method causing a computer having a storage device to self-perform a process comprising:
at the time period, temporarily interrupting the first audio data reproduction, and beginning reproducing the second audio data;
recording within the time period, the first audio data to said storage device while reproducing the second audio data only;

after completion of reproduction of said second audio data, resuming reproducing said first audio data while forcing a reproduction speed of the first audio data reproduction to increase with elapse of time; and wherein said computer is built in a movable body and comprises a present position acquisition device operative to acquire a present position of said movable body, said first audio data is added a position relating to said first audio data, and said computer performs:

acquiring the present position of said movable body from said present position acquisition device;

calculating a distance between the present position acquired and said position added to said first audio data; and exclusively when the distance calculated is less than or equal to a predetermined value, reproducing said first audio data while increasing said reproduction speed.

4. An audio data reproduction method for interrupting current reproduction of first audio data, for reproducing second audio data targeted to be reproduced simultaneously within a same certain time period of first audio data reproduction, said method causing a computer having a storage device to self-perform a process comprising:

at the time period, temporarily interrupting the first audio data reproduction, and beginning reproducing the second audio data;

recording within the time period, the first audio data to said storage device while reproducing the second audio data only;

after completion of reproduction of said second audio data, resuming reproducing said first audio data while forcing a reproduction speed of the first audio data reproduction to increase with elapse of time; and wherein said computer is built in a movable body and comprises a present position acquisition device for obtaining a present position of said movable body and a mobility information acquisition device for acquiring a moving direction and a moving speed of said movable body, said first audio data is added a position relating to said first audio data, and said computer performs:

obtaining the present position of said movable body from said present position acquisition device;

obtaining the moving direction and the moving speed of said movable body from said mobility information acquisition device;

using the present position and the moving direction and the moving speed to calculate a predicted position which is a position of said movable body at termination of the reproduction of said second audio data;

calculating a distance between the calculated predicted position and said position added to said first audio data; and only when the distance calculated is less than or equal to a predefined value, reproducing said first audio data while varying the reproduction speed thereof.

5. The method according to claim 1, wherein the second audio data is an announcement which interrupts the first audio data reproduction.

6. The method according to claim 3, wherein the second audio data is an announcement which interrupts the first audio data reproduction.

7. The method according to claim 4, wherein the second audio data is an announcement which interrupts the first audio data reproduction.

* * * * *